United States Patent [19]
Lundie et al.

[11] Patent Number: 5,403,677
[45] Date of Patent: Apr. 4, 1995

[54] PLIABLE PLASTIC BATTERY COVER WITH INTEGRAL LEAD SLEEVE

[75] Inventors: Keith K. Lundie, Costa Mesa; Kenneth R. Selig, Camarillo, both of Calif.

[73] Assignee: Harris Corporation, Melbourne, Fla.

[21] Appl. No.: 996,663

[22] Filed: Dec. 24, 1992

[51] Int. Cl.$^6$ .......................................... H01M 2/04
[52] U.S. Cl. .................................. 429/65; 429/177; 429/181
[58] Field of Search .................... 429/65, 177, 185, 48, 429/181

[56] References Cited

U.S. PATENT DOCUMENTS

| | | | |
|---|---|---|---|
| 932,841 | 8/1909 | Andrews | 429/65 X |
| 2,022,090 | 11/1935 | Roberts | 429/65 |
| 4,239,322 | 12/1980 | Gordon, Jr. | 339/184 |
| 4,495,260 | 1/1985 | Hardigg et al. | 429/180 |
| 4,562,125 | 12/1985 | Davis | 429/65 |
| 4,920,018 | 4/1990 | Turner | 429/65 |
| 5,021,305 | 6/1991 | Turner | 429/65 |
| 5,200,280 | 4/1993 | Karasa | 429/65 |

FOREIGN PATENT DOCUMENTS 1009922  11/1965  United Kingdom ................ 429/65

*Primary Examiner*—John S. Maples
*Attorney, Agent, or Firm*—Charles E. Wands

[57] ABSTRACT

Exposure or lack of adequate protection for the terminal portion of a battery against the environment is remedied by a protective 'boot', which is formed of a waterproof pliable material and is configured to fit snugly over the casing of the battery and seal the terminal portion of the battery against the surrounding environment. The battery 'boot' may be molded from a rubber material or plasticized polyvinylchloride in the form of a cap portion and a sidewall portion integral with the cap portion. The sidewall portion is shaped to conform with an outer surface portion of the battery casing and is dimensioned such that, when the cover is pliably stretched so as to fit over the battery, the cap portion covers the terminals of the battery, while the sidewall portion fits tight against the battery casing and seals the outer surface portion of the battery against the entry of moisture, foreign matter and the like. To accommodate lead connections to the battery, while still providing a protective seal, the cap portion may be molded to include a sleeve portion which is sized to accommodate the passage of terminal leads therethrough, while simultaneously sealing the leads against the intrusion of moisture, foreign matter and the like.

4 Claims, 3 Drawing Sheets

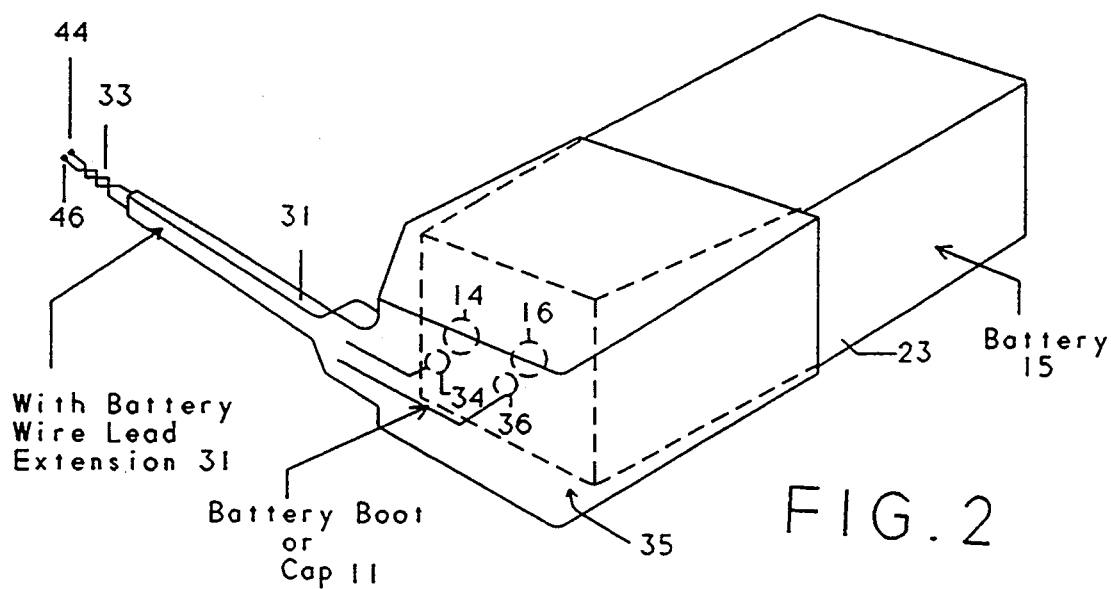

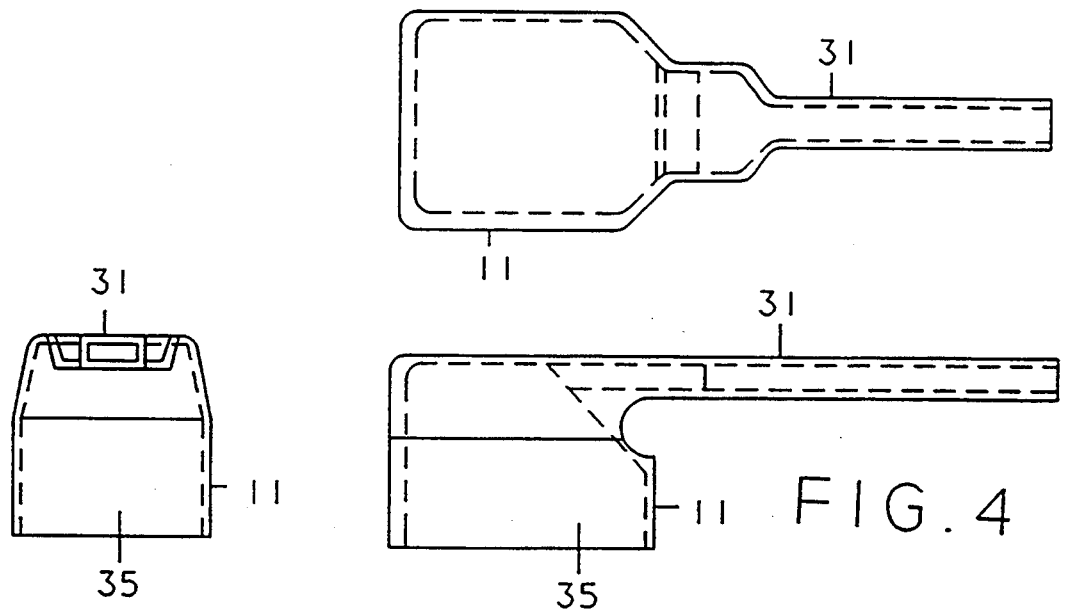

PLIABLE PLASTIC BATTERY COVER WITH INTEGRAL LEAD SLEEVE

FIELD OF THE INVENTION

The present invention relates in general to devices for protecting electrical circuits and the like against potentially detrimental conditions of the ambient environment and is particularly directed to a pliable plastic battery cover or boot, which effectively seals the terminal portion of the battery against the intrusion of moisture, foreign matter and the like.

BACKGROUND OF THE INVENTION

Many electrical circuit devices, especially test equipment, such as telephone test sets and the like, must be used in a variety of environments, some of which may subject the devices to severe operating conditions of temperature, moisture and dust. While it is common practice to seal or pot electronic circuit components of such devices in a housing assembly that effectively protects the active circuitry from the environment, the batteries that are customarily used to provide power for such devices, and which require periodic replacement, are usually housed in a readily accessible compartment that is either unsealed or provides an inadequate barrier against the environment. Moreover, when rechargeable batteries are employed for such devices they are not always transported in a protected fashion.

In each of the above circumstances, the unprotected terminal portions of the batteries become exposed to the environment. Depending upon the severity of the environment, such exposure may effectively electrically connect the positive (+) and negative (−) terminals together, thus shorting the battery, which may eventually corrode or cause deterioration of the terminal portion of the battery, including the terminals themselves and the interface between the terminals and the battery casing. Also, intrusion of excessive and caustic moisture (e.g. salt air) onto the battery terminals may electrically bridge the terminals of the battery and deactivate the electrical circuitry which it powers.

SUMMARY OF THE INVENTION

In accordance with the present invention, such exposure or lack of adequate protection for the terminal portion of a battery against the environment is remedied by means of a protective cover or 'boot' which is formed of a waterproof pliable material and is configured to fit snugly over the casing of the battery and seal the terminal portion of the battery against the surrounding environment. For this purpose the inventive battery 'boot' is preferably formed of a readily elastically deformable waterproof sealing material, such as rubber or plasticized polyvinylchloride, that is molded to have a cap portion and a sidewall portion integral with the cap portion. The sidewall portion is shaped to conform with an outer surface portion of the battery casing and is dimensioned such that, when the sidewall portion of the cover is pliably stretched, so as to fit over the battery casing, the cap portion covers the terminals of the battery, while the sidewall portion fits tight against the battery casing and seals the outer surface portion of the battery against the entry of moisture, foreign matter and the like.

To allow lead connections to the battery, while still providing a protective seal, the cap portion may be molded to include a sleeve portion which is sized to accommodate the passage of terminal leads therethrough, while simultaneously sealing the leads against the intrusion of moisture, foreign matter and the like. First ends of the leads that extend into an interior portion of the cover are held in place by the sleeve portion and include terminal connectors for attachment with the terminals of the battery. Second ends of the leads extending externally of the sleeve portion of the cover are connectable with electrical or electronic circuitry for the battery provides power. Preferably, the sleeve portion extends transversely of the sidewall portion at a top portion of the cap portion, such that, with the boot snugly fit upon the battery, the sleeve portion provides a generally rectilinear sealed passageway for bringing the terminal leads directly to the terminals of the battery. Since the terminal leads are held in place by the sleeve portion of the cover, the terminal connectors at the interior ends of the leads will be located immediately adjacent to the battery terminals, so that by pushing against the sleeve portion of the cover the terminal connectors may be readily urged into fitting engagement with the battery terminals.

BRIEF DESCRIPTION OF THE DRAWINGS

FIG. 2 diagrammatically illustrates, in perspective, a second embodiment of a battery boot in accordance with the present invention; and FIGS. 3, 4 and 5 are respective top, side and end views of the second battery boot embodiment diagrammatically illustrated in FIG. 2.

DETAILED DESCRIPTION

Figure 1:
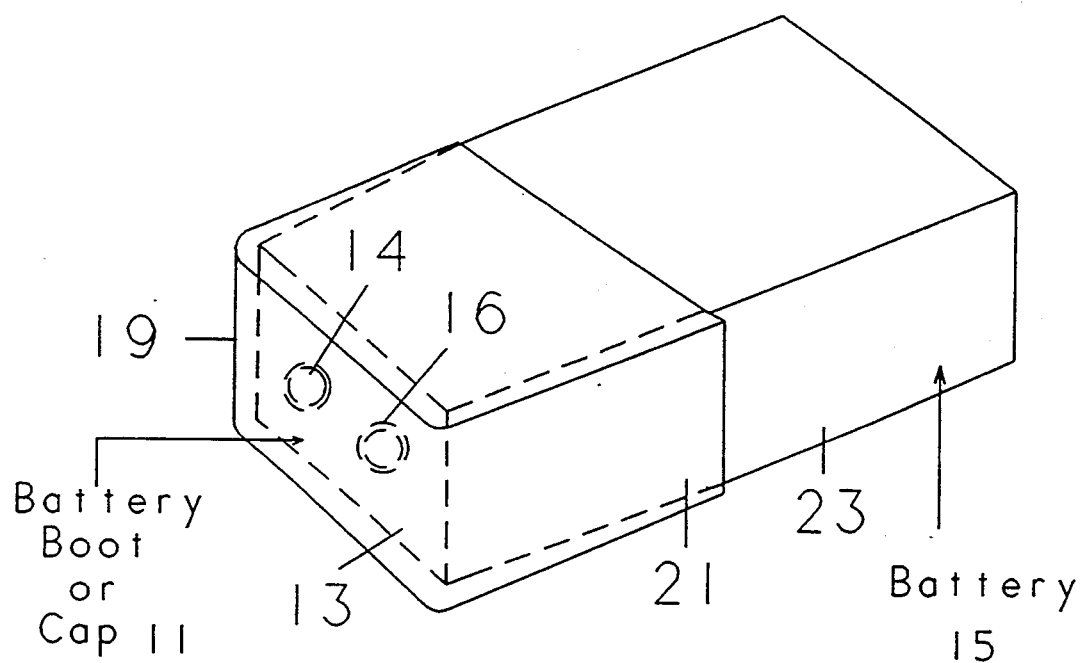
FIG. 1 diagrammatically illustrates, in perspective, a first embodiment of a battery boot in accordance with the present invention.

FIG. 1 diagrammatically illustrates, in perspective, a first embodiment of a protective cover or 'boot' 11 for providing a snug, protective seal for a terminal portion (shown in dotted lines) 13 of a battery 15 (such as a nine volt battery), having terminals 14, 16, against exposure to the surrounding environment. Pursuant to this first embodiment, the protective battery boot is intended to protect the terminals of the battery when the battery is not in use (e.g. during storage or transport). The inventive boot 11 is preferably formed of a waterproof pliable or readily elastically deformable material, such as a rubber type material, plasticized polyvinylchloride, and the like, that is molded in the form of a cap portion 19 and a sidewall portion 21 integral with the cap portion. A wall thickness of the molded boot on the order of fifteen to thirty-five mils has been found to provide requisite pliability and snugness of fit.

The sidewall portion 21 of the boot is shaped to conform with an outer surface portion 23 of the battery casing and is dimensioned such that, when the cover is pliably stretched so as to fit over the battery, the cap portion 19 covers the terminals 13 of the battery and the sidewall portion 21 fits tight against the battery casing 23 and seals the outer surface portion of the battery casing against the entry of moisture, foreign matter and the like.

To accommodate lead connections to the battery, while still providing a protective seal, the cap portion may be molded in the manner illustrated in FIGS. 2–5, to include an additional sleeve portion 31, which is sized to accommodate the passage of terminal leads 33 therethrough, while simultaneously sealing the leads against the intrusion of moisture, foreign matter and the like.

First ends of the leads 33 extend into an interior portion 35 of the boot and include terminal connectors 34, 36 for attachment with the terminals 14, 16 of the battery. The leads 33 are held in place by the sleeve portion 31. Second ends 44, 46 of the leads 33 extending externally of the sleeve portion 31 of the cover are connectable with electrical or electronic circuitry for the battery provides power.

Preferably, as shown in detail in FIGS. 2 and 4, sleeve portion 31 extends transversely of the sidewall portion 21 at a top portion of the cap, such that, with the boot snugly fit over the battery, the sleeve portion 31 provides a generally rectilinear sealed passageway for bringing the terminal leads directly to the terminals of the battery. Since the terminal leads 33 are held in place by the sleeve portion 31 of the cover, terminal connectors 34, 36 at the interior ends of leads 33 will be located immediately adjacent to the battery terminals 14, 16, respectively. As a consequence, manipulating the cap portion, in particular, pushing against the sleeve portion 31 of the cover causes respective terminal connectors 34, 36 to be readily urged into fitting engagement with the battery terminals 14, 16.

As will be appreciated from the foregoing description, in accordance the present invention, the above discussed problem of battery terminal exposure to a potentially damaging environment is effectively obviated by a protective cover or 'boot', which is molded from a readily elastically deformable, waterproof material, such as rubber, plasticized polyvinylchloride, and the like, that is configured to fit snugly over the casing of the battery and seal the terminal portion of the battery against the surrounding environment. Such a pliable material allows the cap portion to cover the terminals of the battery, while the sidewall portion is pliably stretched to fit tight against the battery casing and seal the outer surface portion of the battery against the entry of moisture, foreign matter and the like.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A protective cover for a battery comprising an elastically deformable, waterproof material having a cap portion and a sidewall portion integral with said cap portion, the shape of said sidewall portion conforming with an outer surface portion of said battery and being dimensioned such that said cover may be pliably stretched to fit snugly upon said battery, so that said cap portion covers terminals of said battery, and side sidewall portion seals said outer surface portion of said battery against the entry of moisture and foreign matter, and wherein said cap portion includes a sleeve portion integral therewith, said sleeve portion being sized to accommodate the passage of terminal leads therethrough, while simultaneously sealing said leads against the intrusion of moisture and foreign matter, said leads being held in place by said sleeve portion and having, at first ends thereof, battery terminal connectors, said first ends extending into an interior portion of said cover so that said battery terminal connectors are connectable with terminals of said battery, and second ends of said leads extending externally of said sleeve portion of said cover and being connectable with an electrical device for which said battery provides power.

2. A protective cover for a battery according to claim 1, wherein said sleeve portion extends transversely of said sidewall portion at a top portion of said cap portion, such that, with said protective cover mounted on said battery, said sleeve portion provides a generally rectilinear sealed passageway for bringing said terminal connectors at said first ends of said leads directly to terminals of said battery.

3. A method of protecting a terminal portion of a battery against the intrusion of moisture and foreign matter comprising the steps of:

(a) providing a protective cover formed of a readily elastically deformable waterproof material having a cap portion and a sidewall portion integral with said cap portion, the shape of said sidewall portion conforming with an outer surface portion of said battery and being dimensioned such that, when said cover may be pliably stretched and snugly fit upon said battery, so that said cap portion covers terminals of said battery and said sidewall portion seals said outer surface portion of said battery against the entry of moisture and foreign matter; and (b) placing the protective cover provided in step (a) on said battery such that said cap portion covers said terminal portion of said battery and said sidewall portion seals said outer surface portion of said battery against the entry of moisture and foreign matter, and wherein step (a) further comprises forming a sleeve portion integral with said cap portion, said sleeve portion being sized to accommodate the passage of terminal leads therethrough and secure said leads in place within said sleeve portion, while simultaneously sealing said leads against the intrusion of moisture and foreign matter, and having, at first ends thereof, battery terminal connectors, said first ends extending into an interior portion of said cover so that said battery terminal connectors are connectable with terminals of said battery, and second ends of said leads extending externally of said sleeve portion of said cover and being connectable with an electrical device for which said battery provides power, and wherein step (b) further comprises manipulating said cap portion so as to urge said terminal connectors at said first ends of said leads into electrical connection engagement with terminals of said battery.

4. A method according to claim 3, wherein said sleeve portion extends transversely of said sidewall portion at a top portion of said cap portion, such that, with said protective cover mounted on said battery, said sleeve portion provides a generally rectilinear sealed passageway for bringing said terminal connectors at said first ends of said leads directly to terminals of said battery.

* * * * *